(12) United States Patent
Lesemann et al.

(10) Patent No.: US 8,757,545 B2
(45) Date of Patent: Jun. 24, 2014

(54) SEGMENT OF A FUSELAGE OF AN AIRCRAFT

(75) Inventors: Jan Lesemann, Hamburg (DE); Michael Meyer, Hamburg (DE); Bernd Trahmer, Hamburg (DE); Ralph Sturm, Schenefeld (DE)

(73) Assignee: Airbus Operations GmbH (DE)

( * ) Notice: Subject to any disclaimer, the term of this patent is extended or adjusted under 35 U.S.C. 154(b) by 238 days.

(21) Appl. No.: 13/233,336

(22) Filed: Sep. 15, 2011

(65) Prior Publication Data

US 2012/0068014 A1    Mar. 22, 2012

Related U.S. Application Data

(60) Provisional application No. 61/383,528, filed on Sep. 16, 2010.

(30) Foreign Application Priority Data

Sep. 16, 2010 (DE) .................. 10 2010 045 588

(51) Int. Cl.
  *B64C 1/00* (2006.01)
  *B64C 1/06* (2006.01)
(52) U.S. Cl.
  CPC .......... *B64C 1/068* (2013.01); *B64C 2001/0045* (2013.01); *B64C 1/00* (2013.01)
  USPC .......................................... 244/119; 244/120
(58) Field of Classification Search
  USPC ........................................................... 244/119
  See application file for complete search history.

(56) References Cited

U.S. PATENT DOCUMENTS

| | | | | |
|---|---|---|---|---|
| 3,955,781 | A | * | 5/1976 | Tupolev et al. .................. 244/13 |
| 4,712,751 | A | * | 12/1987 | Hirschel ........................ 244/119 |
| 5,806,797 | A | | 9/1998 | Micale |
| 6,834,833 | B2 | | 12/2004 | Sankrithi |
| 7,410,352 | B2 | | 8/2008 | Sarh |
| 7,721,992 | B2 | | 5/2010 | Keeler, Jr. et al. |
| 7,735,779 | B2 | | 6/2010 | Griess et al. |
| 7,787,979 | B2 | | 8/2010 | Marsh et al. |
| 7,861,970 | B2 | | 1/2011 | Griess et al. |
| 7,874,516 | B2 | * | 1/2011 | Cacciaguerra ................ 244/119 |
| 7,896,291 | B2 | | 3/2011 | Dehn et al. |
| 7,967,250 | B2 | | 6/2011 | Lobato et al. |
| 8,146,860 | B2 | | 4/2012 | Dehn et al. |

(Continued)

FOREIGN PATENT DOCUMENTS

| | | |
|---|---|---|
| GB | 560 580 A | 4/1944 |
| GB | 2443542 A | 5/2008 |
| WO | 2007/120201 A1 | 10/2007 |

OTHER PUBLICATIONS

U.S. Appl. No. 29/387,647, filed Mar. 16, 2011.

(Continued)

*Primary Examiner* — Tien Dinh
*Assistant Examiner* — Justin Benedik
(74) *Attorney, Agent, or Firm* — Lerner, David, Littenberg, Krumholz & Mentlik, LLP (57) ABSTRACT

According to an exemplary embodiment of the invention a fuselage segment of an aircraft fuselage is provided, which aircraft fuselage comprises four different radii of curvature, wherein two radii of curvature comprise center points that are not situated on a vertical symmetry axis of the fuselage segment.

13 Claims, 9 Drawing Sheets

(56) References Cited

U.S. PATENT DOCUMENTS

| | | |
|---|---|---|
| 8,215,582 B2 | 7/2012 | Lynas |
| 2004/0031881 A1 | 2/2004 | Jamgarov |
| 2008/0093503 A1* | 4/2008 | Cacciaguerra ................ 244/119 |
| 2008/0105785 A1* | 5/2008 | Griess et al. ................ 244/120 |
| 2008/0209712 A1 | 9/2008 | Bisiach et al. |
| 2009/0152399 A1 | 6/2009 | Laue |
| 2010/0084510 A1* | 4/2010 | Bock .......................... 244/118.1 |
| 2011/0001006 A1 | 1/2011 | Delahaye et al. |

OTHER PUBLICATIONS

Drawings from the notice of invention with cross-section depictions of the fuselages of Airbus 320, Boeing 737 and Boeing 767 airplanes, 1 page.

* cited by examiner

SEGMENT OF A FUSELAGE OF AN AIRCRAFT

CROSS-REFERENCE TO RELATED APPLICATIONS

This application claims the benefit of the filing date of U.S. Provisional Patent Application No. 61/383,528 filed Sep. 16, 2010, the disclosure of which is hereby incorporated herein by reference.

BACKGROUND OF THE INVENTION

The invention relates to aeronautical engineering. In particular, the invention relates to a fuselage segment for an aircraft, to an aircraft fuselage comprising a fuselage segment, and to an aircraft.

In the interior of short range and medium range aircraft, as a result of the predetermined shape of the fuselage of the aircraft, nowadays space problems are increasingly encountered when stowing various objects within the aircraft cabin. The reasons for this include, for example, additional fees for carrying items of luggage, or the desire to be certain that the luggage actually reaches its destination. Cross sections of fuselages of transport aircraft commonly in use today comprise an upper radius and a lower radius of curvature, which radii both have their centre point in the symmetry plane of the aircraft. This shape has been common in aircraft construction because it was assumed that it would best meet the structural-mechanical aspects of a pressurised body.

However, the above is associated with a disadvantage, not only to passengers but also to the cabin crew of a carrier and overall to the operator of an aircraft, in that the useable cabin volume, in particular in the region of today's hatracks, is limited as a result of this. Apart from reduced comfort to passengers this also represents a limit to the economic usefulness of the aircraft interior to the aircraft operator.

BRIEF SUMMARY OF THE INVENTION

The present invention provides for an improved fuselage segment for an aircraft fuselage.

Stated are a fuselage segment for an aircraft fuselage, an aircraft fuselage comprising a fuselage segment, and an aircraft according to the features of the independent claims. Further improvements of the invention are disclosed in the dependent claims.

The exemplary embodiments described below apply equally to the fuselage segment, to the aircraft fuselage and to the aircraft. For example, features and characteristics which hereinafter are described in relation to the fuselage segment can in a corresponding manner also be implemented as features and characteristics in the aircraft fuselage and in the aircraft, and vice versa.

According to an exemplary embodiment of the invention, a fuselage segment for an aircraft fuselage is provided, wherein the fuselage segment comprises a curved external surface with a first radius of curvature R1, a second radius of curvature R2, a third radius of curvature R3 and a fourth radius of curvature R4, wherein the four radii of curvature are situated in the same plane, and wherein the four radii of curvature have different centre points.

Furthermore, the centre point of a radius of curvature can be understood to be the origin and/or the starting point of the radius of curvature.

Thus in this exemplary embodiment the coordinates of the centre points of the radii of curvature differ. Moreover, it is possible to place at least two of the four centre points of the radii of curvature MR1, MR2, MR3 and MR4 so that they are not situated on the vertical symmetry axis.

In this arrangement the aircraft in this and in any other exemplary embodiments can be an aeroplane.

According to a further exemplary embodiment of the invention, the fuselage segment is designed for installation of at least six seats in each row.

According to a further exemplary embodiment of the invention, the fuselage segment is designed for installation of at least six seats in each row and one or several longitudinal aisles.

According to a further exemplary embodiment of the invention, the four radii of curvature R1, R2, R3 and R4 differ in their extent.

In this arrangement the extent of the radius of curvature can be understood as referring to the length or size of the radius of curvature.

By means of the four different radii of curvature R1, R2, R3 and R4, which can be optimally attuned to each other in relation to their extent, it is possible to create more useable volume in the upper cabin region and/or ceiling region within the aircraft fuselage where it has great significance, without at the same time increasing the fuselage volume in areas where no utility value results. This can, for example, be of particular significance in an airplane. In particular, this can be greatly important in aeroplanes comprising six seats or more than six seats in each row.

This can result in a greater utility value of the fuselage segment or of the entire aircraft fuselage to the aircraft operator without generating significantly higher operating costs.

For example, the four radii of curvature can be designed in the following combination. The first radius of curvature describes the ceiling region of the fuselage which extends symmetrically to the right-hand side and the left-hand side of the symmetry axis of the fuselage segment, wherein the second radius of curvature describes a cabin region of the fuselage that extends approximately from armrest height up to the beginning of the following-on ceiling region. The fourth radius of curvature describes a region of the fuselage that is situated underneath the cabin floor. The third radius of curvature describes a transition region of the fuselage that is situated between the region of the second radius of curvature and the region of the fourth radius of curvature. This exemplary embodiment of the invention is, for example, shown in FIG. 1 and presented in the subsequent description. However, this represents only one exemplary combination of the four radii of curvature, and other combinations are also possible.

According to a further exemplary embodiment of the invention, the fuselage segment has been implemented in a cross section to the longitudinal axis of the fuselage segment so as to be symmetrical to a vertical symmetry axis.

Figure 1:
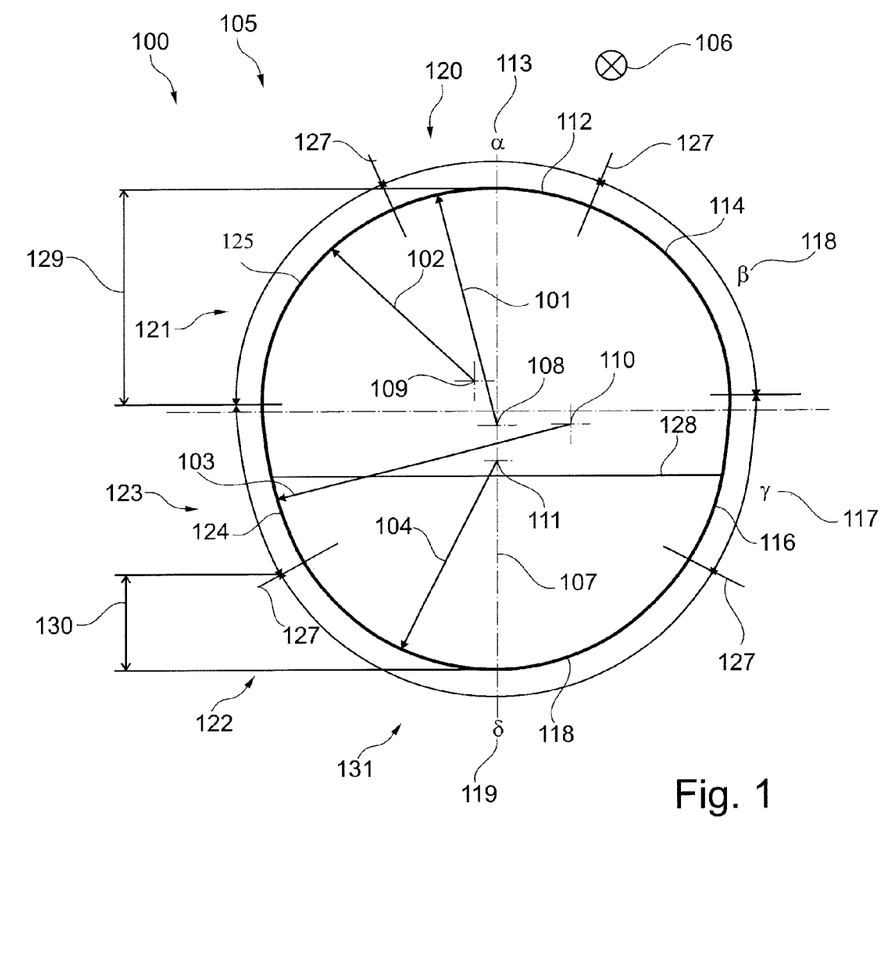
FIG. 1 shows a diagrammatic two-dimensional representation of a cross section of a fuselage segment according to an exemplary embodiment of the invention.

In other words, the fuselage segment is arranged so as to be symmetrical to the symmetry plane of the aircraft comprising an aircraft fuselage that can arise by joining several such fuselage segments. For example, FIG. 1 shows a symmetry axis (reference character 107) within the fuselage segment, wherein FIG. 1 also shows a cross section of the fuselage segment relative to the longitudinal axis (reference character 106 in FIG. 1). In other words, the fuselage segment shown in FIG. 1 is mirror-symmetrical to the vertical symmetry axis.

According to a further exemplary embodiment of the invention, the first radius of curvature comprises the centre point MR1, the second radius of curvature comprises the centre point MR2, the third radius of curvature comprises the centre point MR3 and the fourth radius of curvature comprises the centre point MR4. Furthermore, at least two of the four centre points MR1, MR2, MR3 and MR4 are not situated on the vertical symmetry axis of the fuselage segment.

In other words, two of the four centre points of the four radii of curvature are positioned so as to be spaced apart from the symmetry axis of the aircraft fuselage.

In this arrangement the number of the provided radii of curvature in the case of exemplary embodiments with radii of curvature whose centre points are not situated on the symmetry axis in each case refers to a left-hand or right-hand half of the corresponding fuselage segment. This is explained with reference to the example of FIG. 1: the fuselage segment shown in FIG. 1 comprises four radii. They are shown as an example in relation to the left-hand side of the fuselage segment. However, the four radii relating to the right-hand side, which is symmetrical to said left-hand side, are not shown.

In relation to the respective opposite half of the fuselage segment, according to the symmetry to the vertical symmetry axis, the centre points that are not situated on the symmetry axis shift to the other half. This can, for example, be taken from FIG. 1.

For example, it is possible for two of the four above-mentioned radii of curvature that describe the fuselage in the region of the cabin to be situated outside the vertical symmetry axis. In this arrangement, the already described ceiling region of the aircraft fuselage is not considered to be a region of the cabin. This is because in the assembled state the fuselage in the ceiling region is not visible as a result of luggage racks and/or lining panels, underneath which, for example, electrical systems can be installed. In the example that has already been stated above, the cabin region is formed by fuselage sections that are described by the second and third radii of curvature.

As a result of this it is possible to select radii of curvature in a size that results in greater useable volume in the upper cabin region when compared to that of conventional fuselage cross sections. This results in a higher-value cabin, without involving significantly higher costs to the future operator of the aircraft, because the circumference of the fuselage and thus the weight and aerodynamic resistance need not be changed in a significantly disadvantageous manner.

The use of four different radii of curvature makes it possible to achieve a significant increase in the cabin width in the region of the seated passenger, in particular from armrest height upwards.

In addition, as a result of this described measure an increase in the volume for the on-board luggage or other objects that are to be stowed for passengers in the aircraft is achieved if the aforesaid are stowed above the seated passenger, as is common practice at present. In this and in any other exemplary embodiment the aircraft can be an aeroplane.

Furthermore, for example, the centre points of the radii of curvature that describe the fuselage in the region of the cabin, in other words the second radius of curvature and the third radius of curvature, can be situated outside the symmetry axis. In this manner it is possible to select radii of curvature of a size that results in more useable volume in the upper cabin region than is the case in conventional fuselage cross sections.

By means of a clever selection of the entire arrangement, i.e. firstly the radii of curvature in the region of the cabin, which radii of curvature are situated outside the symmetry axis, secondly the number and thirdly the extent or the size of the selected different radii of curvature, a maximum of useable volume of a high value relating to the cabin, and at the same time the smallest possible fuselage circumference are achieved. This can signify low operating costs for the aircraft operator.

For example, the first radius of curvature, whose centre point is situated on the symmetry axis, can represent the ceiling region within the fuselage segment. The following-on second radius of curvature, whose centre point is not situated on the symmetry axis, subsequently extends in the upper cabin region, for example, until approximately seating height within the cabin that in future will be formed by the fuselage segment. The following-on third radius of curvature, whose centre point is also situated outside the symmetry axis, then forms the transition region to the underfloor region. In this underfloor region the fuselage segment is, for example, formed by the fourth radius of curvature, whose centre point can again be situated on the symmetry axis.

In other words, the upper region of the fuselage cross section can thus be described by at least two different radii of curvature; the first radius of curvature R1 and the second radius of curvature R2. This upper region is indicated in FIG. 1 by reference character 129. The lower region of the fuselage cross section, in FIG. 1 indicated by reference character 130, can be described by at least one radius of curvature, the fourth radius of curvature R4, which can differ from the radii of curvature in the upper region. Both cross-sectional regions are connected, in the region of the floor, by means of a so-called transition radius, the third radius of curvature R3, which again differs from the radii of curvature in the upper region and in the lower region of the fuselage.

When compared to conventional fuselage cross sections, neither the circumference, the cross-sectional area nor the weight significantly increase as a result of the advantageous measures described above.

Overall a higher-value cabin results, without incurring significantly higher costs to the operator of the aircraft.

According to a further exemplary embodiment of the invention, the ratio of the first radius of curvature R1 to the second radius of curvature R2, R1/R2 is smaller than 1.7, the ratio of the third radius of curvature R3 to the second radius of curvature R2, R3/R2 is smaller than 1.7, and the ratio of the radius of curvature R3 to the radius of curvature R4, R3/R4 is smaller than 1.7.

According to a further exemplary embodiment of the invention, at least one ratio of two radii of curvature, which ratio has been selected from the group comprising R1 to R2, R3 to R2, and R3 to R4, does not exceed the value 1.7.

As a result of this limited ratio of two radii of curvature that are adjacent in the circumference of the fuselage it can be ensured that high bending moments in frame elements are avoided. Thus, reinforcement and the very considerable associated structural expenditure within the fuselage segment can be avoided by the present invention. This can not only reduce the production costs of the aircraft fuselage comprising such a fuselage segment, but also reduce the weight and thus the operating costs.

As a result of this clever selection of the radii of curvature it is possible to keep low the mechanical bending moments within the fuselage segment and thus within the aircraft fuselage.

According to a further exemplary embodiment of the invention, the first radius of curvature R1 describes a first circumferential section UA1 of the fuselage segment at an angle α, wherein the second radius of curvature R2 describes a second circumferential section UA2 of the fuselage segment at an angle β. The third radius of curvature R3 describes a third circumferential section UA3 of the fuselage segment at an angle γ, wherein the fourth radius of curvature R4 describes a fourth circumferential section UA4 of the fuselage segment at an angle δ. Furthermore, the following applies to this exemplary embodiment: α is smaller than β, β is greater than γ, and γ is smaller than δ.

Since the angles are not absolute angles with identical 0 degree positions, but merely relative angles that depict the length of the corresponding circumferential section of the fuselage segment, the angles can be directly compared with each other.

This exemplary embodiment, which is shown as an example in FIG. 1, describes a fuselage segment in which the first radius of curvature R1 is greater than the second radius of curvature R2, the second radius of curvature R2 is smaller than the third radius of curvature R3, and the third radius of curvature R3 again is greater than the fourth radius of curvature R4. Furthermore, the angles are as follows relative to each other: α is smaller than β, β is greater than γ, and γ is smaller than δ.

Furthermore, only the centre points of the first radius of curvature and fourth radius of curvature are situated on the symmetry axis, whereas the centre points of the second radius of curvature and of the third radius of curvature are positioned at a distance thereof.

As a result of this advantageous selection of the radii of curvature, more useable volume in the upper cabin region can be achieved with conventional fuselage cross sections; particularly in the region of the seated passenger a significant increase in the cabin width can be achieved, in particular from armrest height upwards. Furthermore, more stowage volume, for example for the on-board luggage, can be provided.

According to a further exemplary embodiment of the invention, the first circumferential section UA1 is situated in the ceiling region of the fuselage segment, and the second circumferential section UA2 is situated in the cabin region of the fuselage segment, wherein the fourth circumferential section UA4 is situated in the underfloor region of the fuselage segment, and wherein the third circumferential section UA3 extends as a transition region between the cabin region and the underfloor region.

In this arrangement the circumferential section UA3 can also be considered to be part of the cabin region.

According to a further exemplary embodiment of the invention, the first radius of curvature is greater than the second radius of curvature.

In this arrangement the other radii of curvature can be selected as desired. For example, it is also possible for the third radius of curvature in addition to be greater than the second radius of curvature, and for the third radius of curvature to be greater than the fourth radius of curvature.

According to a further exemplary embodiment of the invention, the third radius of curvature is greater than the second radius of curvature. In this arrangement it is possible for the other radii of curvature to be selected as desired. Also possible is a combination with a first radius of curvature that is greater than the second radius of curvature.

According to a further exemplary embodiment of the invention, the third radius of curvature is greater than the fourth radius of curvature.

In this arrangement the first radius of curvature can, for example, describe the first circumferential section in the ceiling region of the fuselage segment, and the second radius of curvature can describe the following-on circumferential section in the cabin region. The fourth radius of curvature can, for example, describe the circumferential section in the underfloor region, and the third radius of curvature can describe the circumferential section that forms the transition region between the cabin region and the underfloor region.

According to a further exemplary embodiment of the invention, the centre point of the second radius of curvature MR2 and the centre point of the third radius of curvature MR3 are not situated on the vertical symmetry axis.

In this arrangement the term "second radius of curvature" can, in particular, refer to the radius of curvature that represents the circumferential section of the fuselage segment in the cabin region, and the term "third radius of curvature" can describe the circumferential section of the fuselage segment that represents the transition region between the cabin region and the underfloor region.

According to a further exemplary embodiment of the invention, the first circumferential section UA1 extends clockwise and anticlockwise from the vertical symmetry axis, wherein the following circumferential sections follow on from the first circumferential section UA1 clockwise in the following order: the second circumferential section UA2, followed by the third circumferential section UA3, followed by the fourth circumferential section UA4, followed by the fifth circumferential section UA5 and followed by the sixth circumferential section UA6.

This exemplary embodiment, as shown as an example in FIG. 1, illustrates that in each case in the cabin region and in the transition region there is a circumferential section of the fuselage segment that comprises an identical counterpart on the opposite side of the symmetry axis. In contrast to this, the circumferential sections UA1 and UA4, which are formed on the upper end and on the lower end of the fuselage segment, form individual circumferential sections that do not comprise a second identical, circumferential section.

According to a further exemplary embodiment of the invention, due to the vertical symmetry axis, the third circumferential section UA3 and the fifth circumferential section UA5 are in each case identical in terms of the curvature and the circumferential length, and wherein, due to the vertical symmetry axis, the second circumferential section UA2 and the sixth circumferential section UA6 are in each case identical in terms of the curvature and the circumferential length.

The above is shown, for example, in FIG. 1.

According to a further exemplary embodiment, an aircraft fuselage comprising a fuselage segment according to any one of the preceding or following exemplary embodiments is provided.

According to a further exemplary embodiment of the invention, an aircraft comprising an aircraft fuselage is provided, which aircraft fuselage comprises a fuselage segment according to a preceding or following exemplary embodiment.

It may be considered a core aspect of the invention to provide for a fuselage segment of an aircraft that has four different radii of curvature in the same geometrical plane, wherein two of the radii of curvature comprise centre points that are not situated on the symmetry axis of the aircraft fuselage.

In this arrangement the aeroplane can comprise six or more seats in each row and one or several longitudinal aisles.

According to a further aspect of the invention, as a result of an advantageous selection of the radii of curvature and of the length of the circle portions the mechanical bending moments of the fuselage segment and thus of the aircraft fuselage can be kept low, while at the same time an increased volume within the cabin is provided to the user.

Below, exemplary embodiments of the invention are described with reference to the figures.

DETAILED DESCRIPTION

The illustrations in the figures are diagrammatic and not to scale.

In the following description of the figures the same reference characters are used for identical or similar elements.

FIG. 1 shows a fuselage segment 100 of an aircraft fuselage, wherein the fuselage segment comprises a curved external surface 131 with a first radius of curvature R1, 101, a second radius of curvature R2, 102, a third radius of curvature R3, 103, and a fourth radius of curvature R4, 104, wherein the four radii of curvature are situated in the same plane, and wherein the four radii of curvature comprise different centre points.

The four radii of curvature are all situated in one plane and represent different circumferential sections of the fuselage segment. Since FIG. 1 shows a cross section of the fuselage segment the diagram clearly shows that the four radii are situated in a plane that is perpendicular to the longitudinal axis of the aircraft.

In this arrangement FIG. 1 shows that the four radii of curvature R1, R2, R3 and R4 differ in their extents and thus differ in their length.

In this arrangement the fuselage segment in FIG. 1 is shown in a cross section 105 that extends perpendicularly to the longitudinal axis 106 of the fuselage segment. The diagram shows a vertical symmetry axis 107 in relation to which the fuselage segment is built in mirror-symmetry. Furthermore, the centre points of the four radii of curvature are shown. The centre point 108 of the first radius of curvature and the centre point 111 of the fourth radius of curvature are situated on the symmetry axis 107. In contrast to this, the centre point 109 of the second radius of curvature and the centre point 110 of the third radius of curvature are not situated on the symmetry axis 107, but instead beside it on the left-hand side (in the case of the second radius of curvature) or beside it on the right-hand side (in the case of the third radius of curvature).

It should be pointed out anew that the second and the third radius of curvature, R2 and R3, in the right-hand part, shown in FIG. 1, of the fuselage segment comprise the same extent, in other words the same length, while their centre point positions are, however, mirrored on the symmetry axis 107. However, in the context of the present invention, reference is made to four different radii of curvature.

In other words, there is a second radius of curvature relating to the left-hand side of the fuselage segment, and a second radius of curvature relating to the right-hand side of the fuselage segment; likewise there is a third radius of curvature relating to the left-hand side of the fuselage segment, and a third radius of curvature relating to the right-hand side of the fuselage segment. However, above and below, reference is merely made to a second radius of curvature and to a third radius of curvature, because as a result of the symmetry of the symmetry axis 107 the precise position of the centre point of the second radius of curvature and of the third radius of curvature automatically results in relation to the right-hand side.

Furthermore, FIG. 1 shows that four centre points 108 to 111 comprise different coordinates. Moreover, the diagram shows that the first radius of curvature 101 describes a first circumferential section 112 of the fuselage segment at the angle α 113. The second radius of curvature 102 describes a second circumferential section 114 of the fuselage segment at the angle β 115. The third radius of curvature describes a third circumferential section 116 of the fuselage segment at the angle γ 117, wherein the fourth radius of curvature describes a fourth circumferential section 118 of the fuselage segment at the angle δ 119.

Furthermore, the diagram shows that in this exemplary embodiment of the invention the extent of α is smaller than the extent of β, that the extent of β is greater than the extent of γ, and that the extent of γ is smaller than the extent of δ.

Furthermore, the diagram shows that these angle details do not refer to an absolute angle, which angle details relate to a common origin, but are only intended to indicate the width or the length of the respective circumferential section. This applies to all the exemplary embodiments of the present invention.

Furthermore, the upper region 120 of the fuselage segment in FIG. 1 is designated the ceiling region of the fuselage segment, and the region 121 is designated the cabin region of the fuselage segment. Since a floor 128 is shown, as an example, within the fuselage segment, which floor 128 can, however, also be situated in some other position further above or further below the position shown, the region of the fuselage segment situated below is designated the underfloor region 122. The third circumferential section is shown as the transition region 123 between the cabin region and the underfloor region.

For example, it is possible to select the radii of curvature in such a manner that both the ratio of R1 to R2, the ratio of R3 to R2 and the ratio of R3 to R4 do not exceed the value 1.7. This exemplary embodiment also shows that both the first radius of curvature is greater than the second radius of curvature, and the third radius of curvature is greater than the second radius of curvature. Moreover, the third radius of curvature is greater than the fourth radius of curvature.

As a result of this clever selection of the radii of curvature and of the length of the circle portions it is possible to keep low the mechanical bending moments within the fuselage segment and thus within the aircraft fuselage.

As a result of the four different radii of curvature, which differ both in relation to their centre points and in length, in the region of the seated passenger a significant increase in the cabin width is achieved, which manifests itself in particular at armrest height and above. Likewise, in this manner an increase in the volume for the on-board luggage or other objects that are to be stowed within the cabin is achieved if it is assumed that the luggage is stowed above the seated passenger, as is common practice at present. As a result of the asymmetric placement of the centre points of the second radius of curvature and the third radius of curvature a design can be achieved in which the circumference and area of the fuselage cross section are reduced when compared to conventional fuselage cross sections which provide comparable space in the cabin region.

When compared to conventional fuselage cross sections with lower volume requirements, neither the circumference nor the cross sectional area significantly increases as a result of the embodiment according to the invention of the fuselage segment. Because of the vertical symmetry axis 107 the fifth circumferential section 124 and the third circumferential section 116 are identical. Furthermore, because of the vertical symmetry axis the second circumferential section 114 and the sixth circumferential section 125 are also identical.

According to a further exemplary embodiment, it is also possible to use more than the two shown radii of curvature in the upper region of the fuselage cross section 129. Likewise, it is also possible to use more than one shown radius of curvature in the lower region of the fuselage cross section 130. Overall, this results in a higher-value cabin, without involving significantly higher costs to the future operator of the aircraft.

Figure 2:
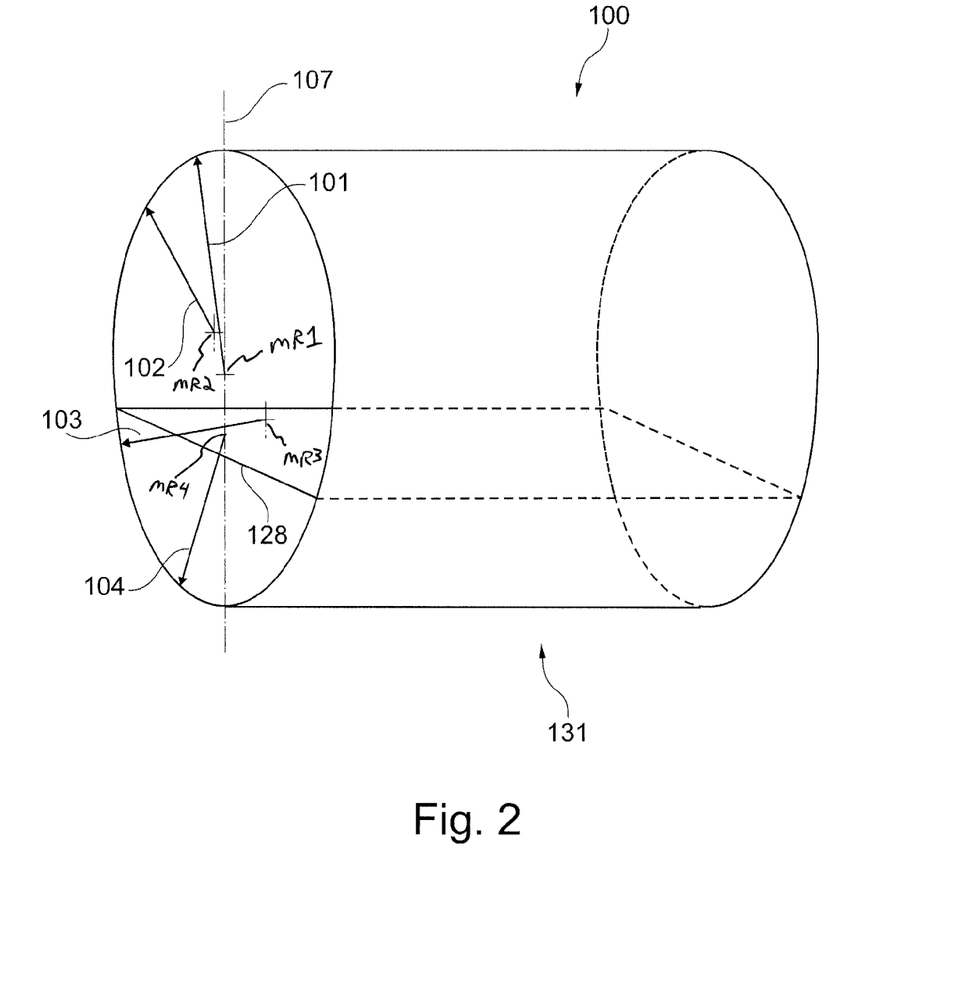
FIGS. 2 and 3 show diagrammatic three-dimensional representations of fuselage segments according to exemplary embodiments of the invention.

FIG. 2 shows a fuselage segment 100, wherein the fuselage segment comprises a first radius of curvature R1 101, a second radius of curvature R2 102, a third radius of curvature R3 103 and a fourth radius of curvature R4 104. In this arrangement the four radii of curvature R1, R2, R3 and R4 differ in terms of their extent. Also shown is the curved external surface 131. The diagram also shows that the aforesaid comprise different centre points, and that the second radius of curvature and the third radius of curvature comprise asymmetric centre points, in other words they are not situated on the symmetry axis 107.

Figure 3:
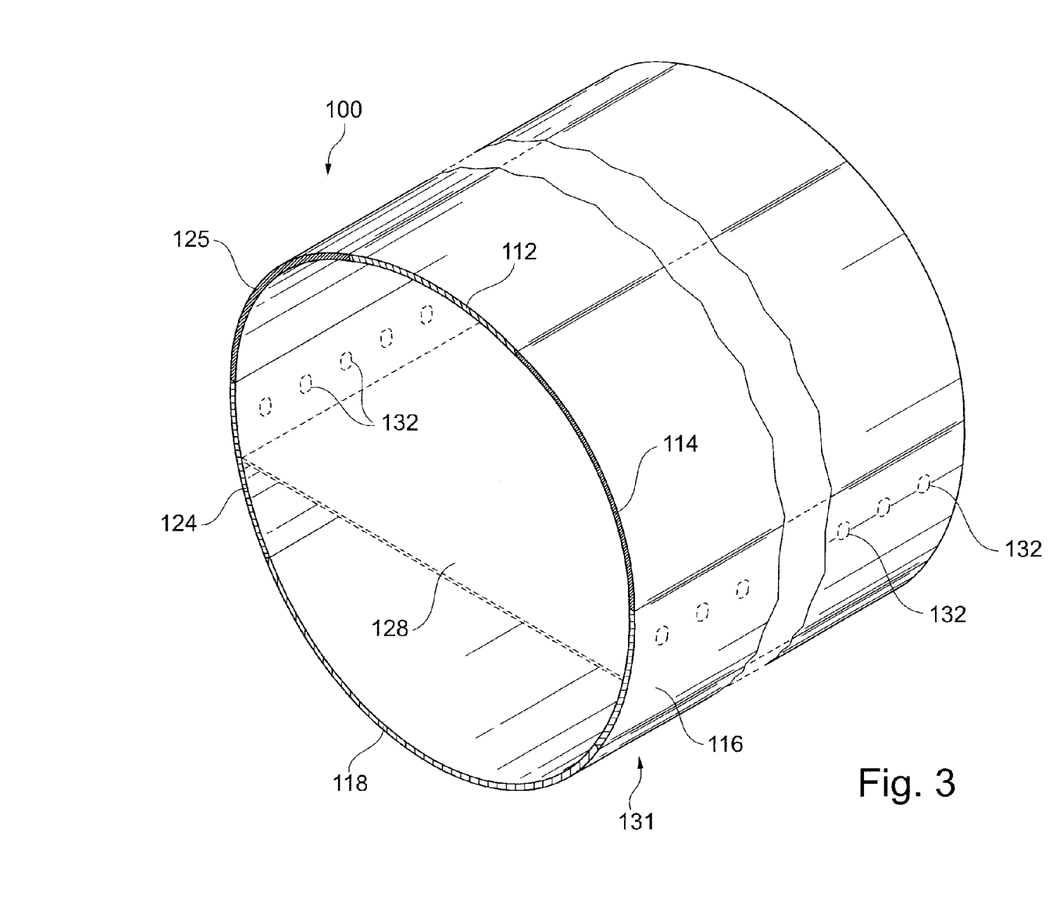

FIG. 3 shows a perspective view of a fuselage segment according to an exemplary embodiment of the invention. The fuselage segment comprises a curved external surface 131 with a first radius of curvature R1 that forms or describes a first circumferential section 112 of the fuselage segment at the angle α. The second radius of curvature R2 forms or describes a second circumferential section 114 of the fuselage segment at the angle β. The third radius of curvature R3 forms or describes a third circumferential section 116 of the fuselage segment at the angle γ, wherein the fourth radius of curvature R4 forms or describes a fourth circumferential section 118 of the fuselage segment at the angle δ. Also shown is the floor 128. In this and in any other exemplary embodiment the floor 128 can, however, have been positioned in the fuselage segment in a higher or lower position.

In the context of FIG. 3 the angles α, β, γ and δ analogously designated to those in FIG. 1, however, said angles are not shown in FIG. 3. In this arrangement the following applies in relation to this exemplary embodiment: α<β, β>γ and γ<δ. Furthermore, the following applies: a ratio of two adjacent radii of curvature, which ratio is selected from the group comprising R1/R2, R3/R2, and R3/R4, does not exceed the value 1.7. Furthermore, the following applies: R1>R2, R2<R3 and R3>R4.

By means of the four different radii of curvature R1, R2, R3 and R4, which can be optimally attuned to each other in relation to their extent, it is possible to create more useable volume in the upper cabin region and/or ceiling region within the aircraft fuselage where it has great significance, without at the same time increasing the fuselage volume in areas where no utility value results. This can, for example, be of particular significance in an aircraft. In particular, this can be greatly important in aeroplanes comprising six seats or more than six seats in each row.

In this exemplary embodiment of the invention, the first radius of curvature comprises the centre point MR1, the second radius of curvature comprises the centre point MR2, the third radius of curvature comprises the centre point MR3, and the fourth radius of curvature comprises the centre point MR4. Examples of these centre points are shown in FIG. 2. Furthermore, at least two of the four centre points MR1, MR2, MR3 and MR4 are not situated on the vertical symmetry axis of the fuselage segment.

Figure 4:
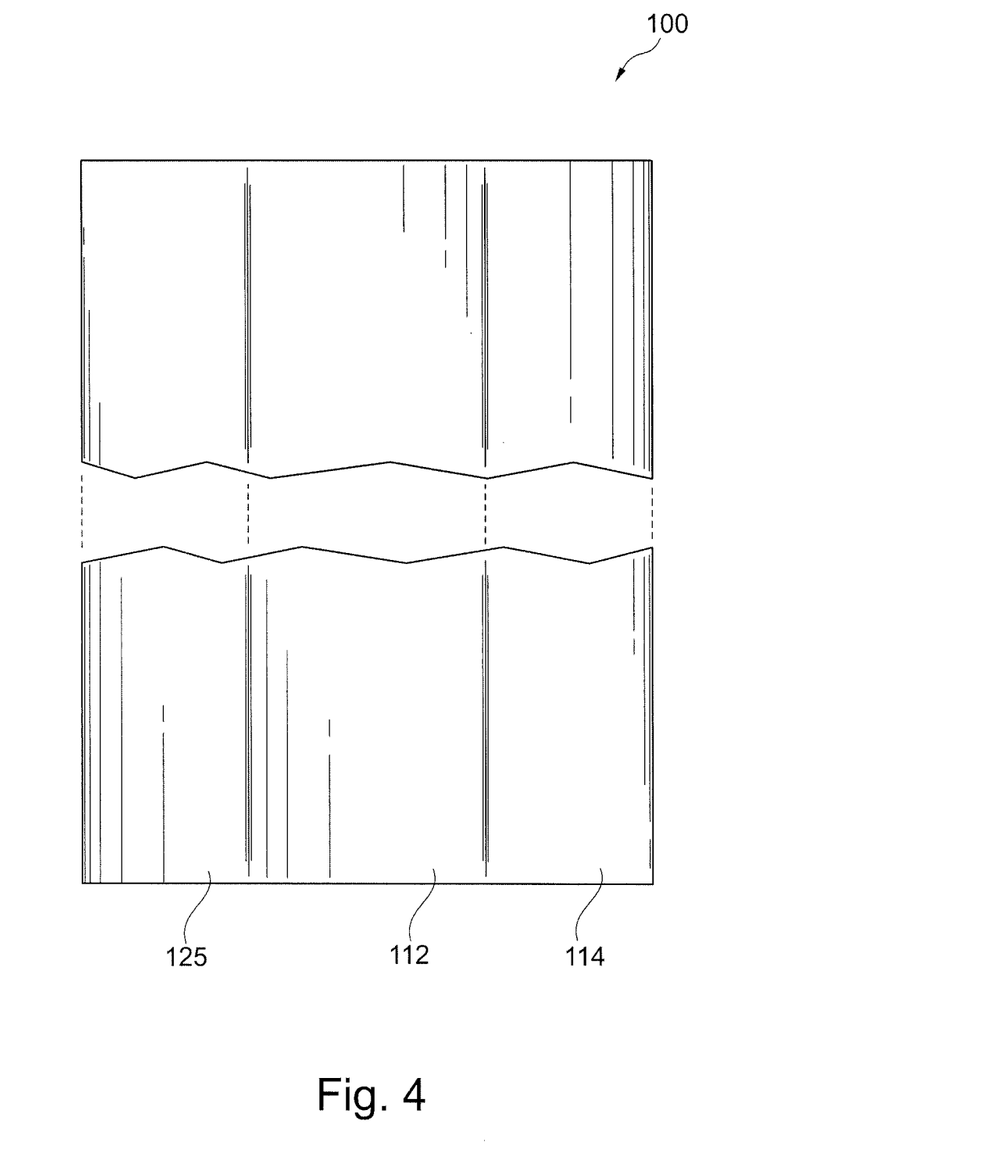
FIGS. 4 to 8 show diagrammatic two-dimensional representations of fuselage segments according to exemplary embodiments of the invention.

FIG. 4 shows a top view of the fuselage segment 100 of FIG. 3. Therefore the first circumferential section 112, the second circumferential section 114 and the sixth circumferential section 125 are shown.

Figure 5:
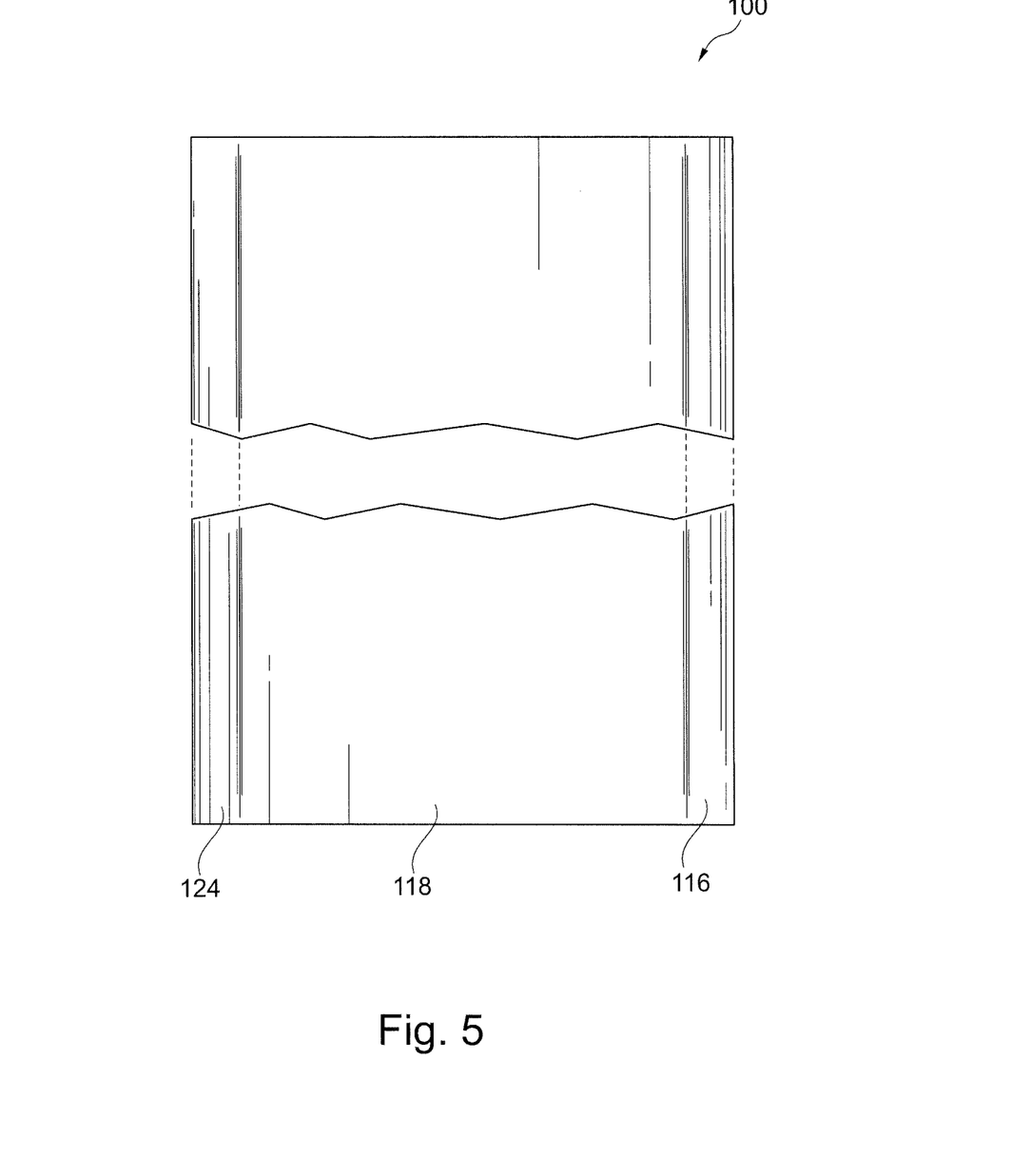

FIG. 5 shows a bottom view of the fuselage segment 100 of FIG. 3. Therefore the bottom region of the fuselage segment is shown. The third circumferential section 116, the fourth circumferential section 118 and the fifth circumferential section 124 are shown.

Figure 6:
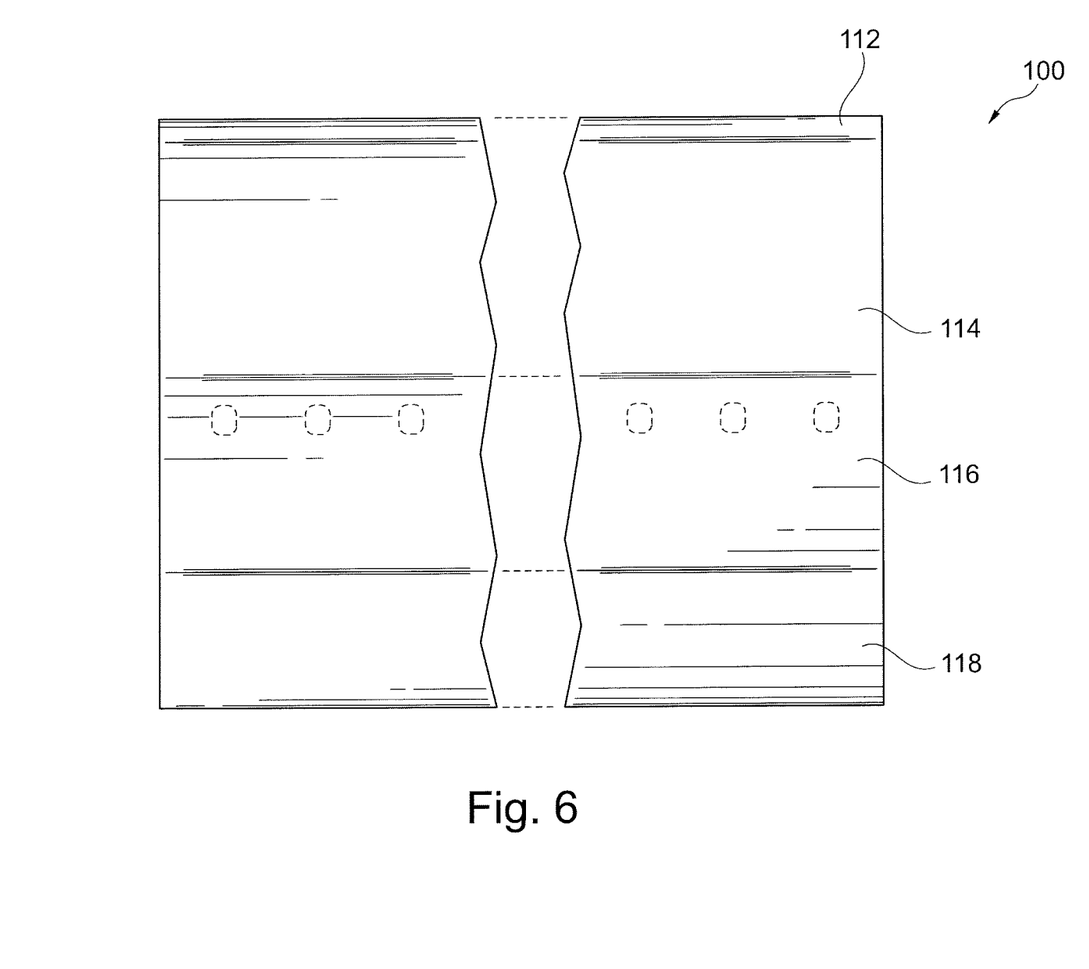

FIG. 6 shows a lateral view of the right-hand side of the fuselage segment 100 of FIG. 3, with the circumferential section 112, 114, 116 and 118 being shown. In this arrangement the term "right-hand side" refers to the side that is situated on the right-hand side in FIGS. 3 and 7. The left-hand side of the fuselage segment is the mirror image thereof. In other words, the four radii are arranged in such a manner that the left-hand side and the right-hand side of the fuselage segment are symmetrical in relation to each other.

Figure 7:
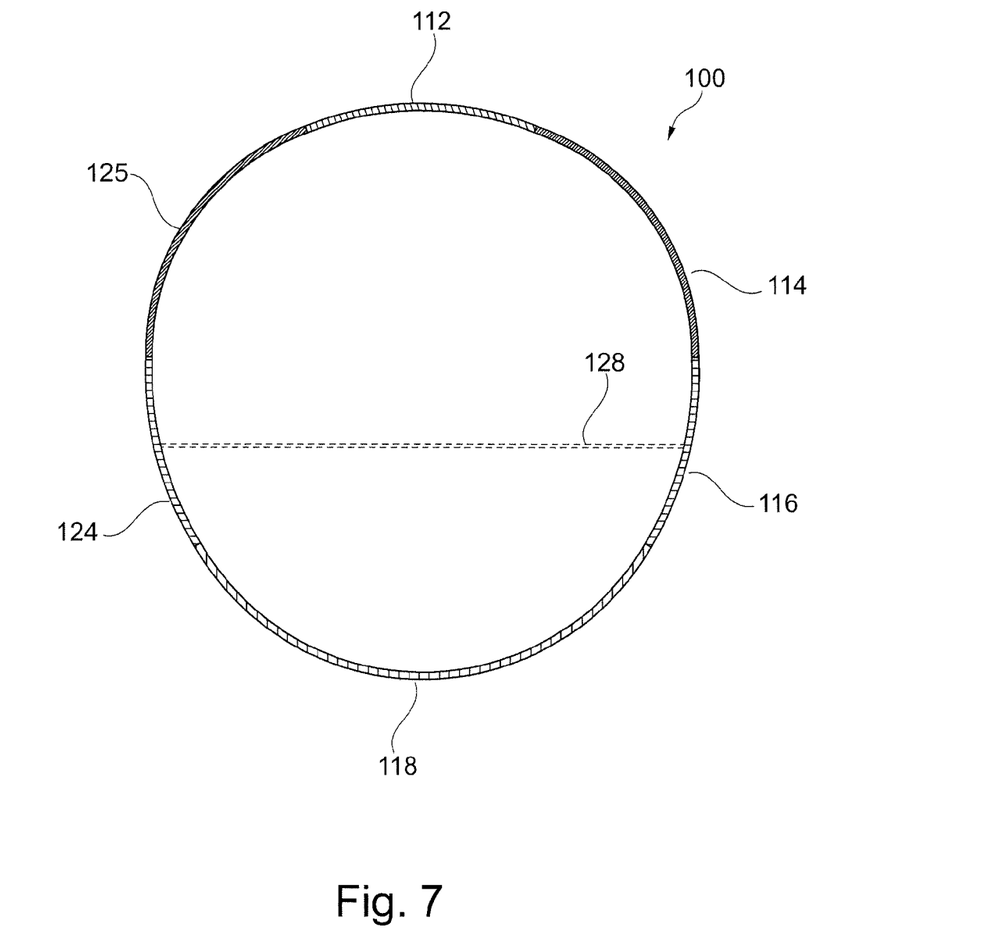

FIG. 7 shows a front view of the fuselage segment 100 of FIG. 3, and consequently all six circumferential sections 112, 114, 116, 118, 124 and 125 are shown. Furthermore, as an example, a floor 128 is shown.

Figure 8:
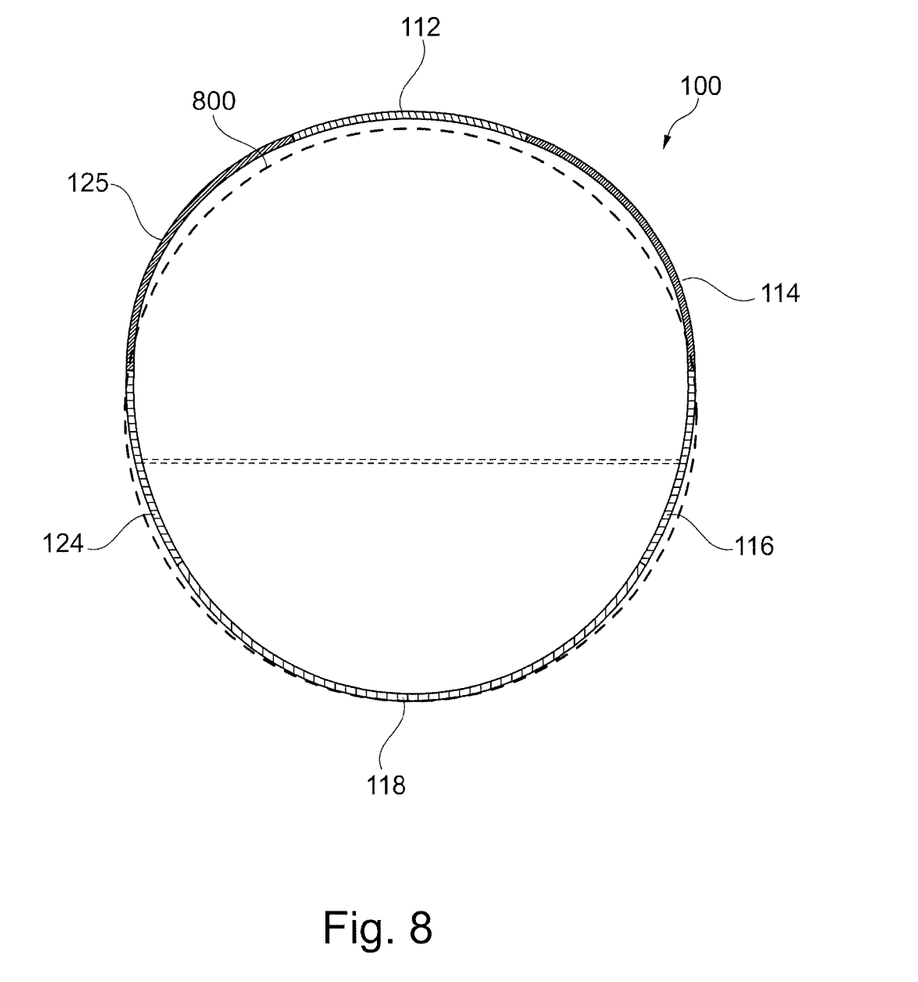

FIG. 8 corresponds to the front view of the fuselage segment 100 of FIG. 7, except that in addition, for comparison, a perfect circle 800 is shown, which of course only comprises one radius. The circle is shown in a dashed line for illustrative purposes only; it does not form part of the invention.

Furthermore, it should be mentioned that the hatched areas shown within the FIGS. 3, 7 and 8 are only used to illustrate the various radii and/or the corresponding circumferential sections so that it is possible to visually differentiate among them. However, the hatched areas do not indicate that particular thicknesses of the fuselage segment are required or that particular materials are used in the construction of the fuselage segment. The hatched areas are only provided to make it possible to differentiate among the four different radii and/or the corresponding circumferential sections.

The jagged lines that in FIGS. 3 to 6 extend along the circumference of the fuselage segment do not form part of the invention; they merely indicate that this exemplary embodiment of the invention can comprise any desired length. The floor 128 and the windows 132 are indicated by dashed lines and are shown only for illustrative purposes. The floor and the windows thus do not form part of the invention.

Figure 9:
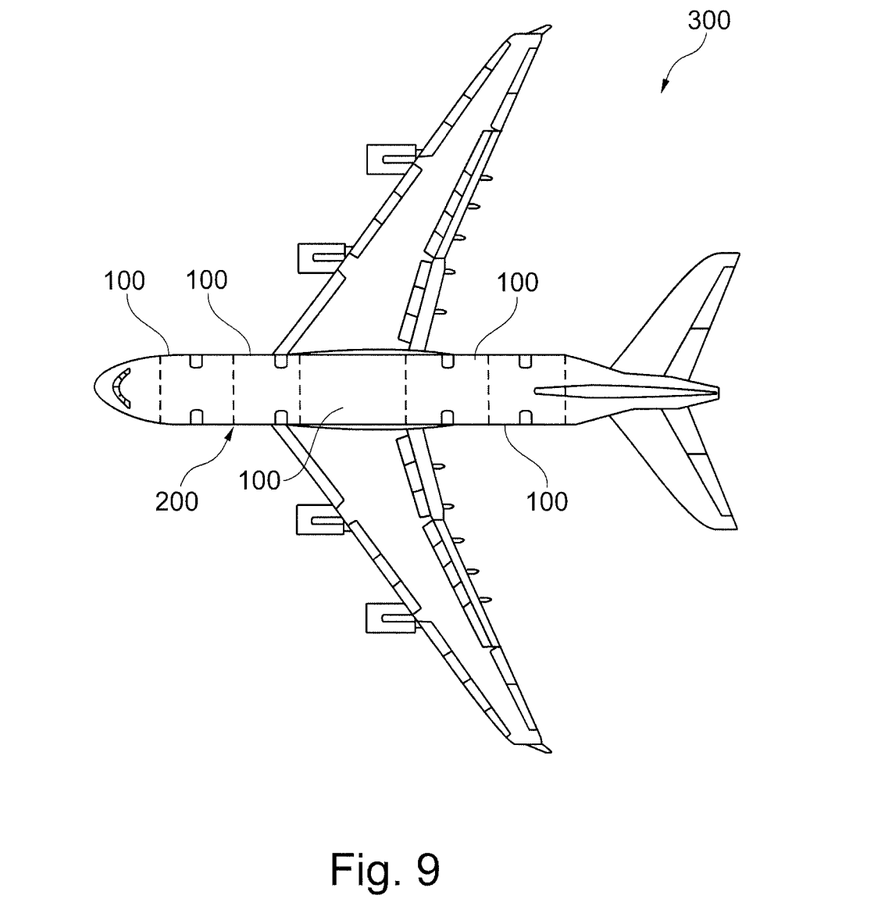
FIG. 9 shows a diagrammatic two-dimensional representation of an aircraft comprising an aircraft fuselage and a fuselage segment according to an exemplary embodiment of the invention.

FIG. 9 shows an aircraft 300 with an aircraft fuselage 200 that comprises several fuselage segments according to the invention according to an exemplary embodiment of the invention. In this illustration the aircraft is designed, as an example, as an aeroplane.

In this arrangement the aeroplane can, for example, comprise six or more seats in each row, and one or several longitudinal aisles.

The invention claimed is:

1. A fuselage segment for an aircraft fuselage,
wherein the fuselage segment comprises a curved external surface with a first radius of curvature (R1), a second radius of curvature (R2), a third radius of curvature (R3) and a fourth radius of curvature (R4),
wherein the four radii of curvature are situated in the same plane, and
wherein the four radii of curvature comprise different centre points;
wherein the first radius of curvature (R1) describes a first circumferential section (UA1) of the fuselage segment at an angle α,
wherein the second radius of curvature (R2) describes a second circumferential section (UA2) of the fuselage segment at an angle β, the second circumferential section (UA2) being adjacent to the first circumferential section (UA1);

wherein the third radius of curvature (R3) describes a third circumferential section (UA3) of the fuselage segment at an angle γ, the third circumferential section (UA3) being adjacent to the second circumferential section (UA2);

wherein the fourth radius of curvature (R4) describes a fourth circumferential section (UA4) of the fuselage segment at an angle δ, the fourth circumferential section (UA4) being adjacent to the third circumferential section (UA3); and wherein the following applies: $\alpha<\beta$, $\beta>\gamma$ and $\gamma<\delta$.

2. The fuselage segment according to claim 1, wherein the four radii of curvature (R1, R2, R3 and R4) differ in their extent.

3. The fuselage segment according to claim 1,
wherein the first radius of curvature comprises the centre point (MR1),
wherein the second radius of curvature comprises the centre point (MR2),
wherein the third radius of curvature comprises the centre point (MR3),
wherein the fourth radius of curvature comprises the centre point (MR4),
wherein the fuselage segment has been implemented in a cross section to a longitudinal axis of the fuselage segment so as to be symmetrical to a vertical symmetry axis, and
wherein at least two of the four centre points (MR1, MR2, MR3 and MR4) are not situated on the vertical symmetry axis.

4. The fuselage segment of claim 3,
wherein the centre point of the second radius of curvature (MR2) and the centre point of the third radius of curvature (MR3) are not situated on the vertical symmetry axis.

5. The fuselage segment of claim 1,
wherein the first circumferential section (UA1) is situated in a ceiling region of the fuselage segment,
wherein the second circumferential section (UA2) is situated in a cabin region of the fuselage segment,
wherein the fourth circumferential section (UA4) is situated in an underfloor region of the fuselage segment, and
wherein the third circumferential section (UA3) extends as a transition region between the cabin region and the underfloor region.

6. The fuselage segment of claim 1,
wherein at least one ratio of two radii of curvature, which ratio has been selected from the group consisting of R1/R2, R3/R2, and R3/R4, does not exceed the value 1.7.

7. The fuselage segment of claim 1,
wherein the extent of the first radius of curvature (R1) is greater than the extent of the second radius of curvature (R2).

8. The fuselage segment of claim 1,
wherein the extent of the third radius of curvature (R3) is greater than the extent of the second radius of curvature (R2).

9. The fuselage segment of claim 1,
wherein the extent of the third radius of curvature (R3) is greater than the extent of the fourth radius of curvature (R4).

10. The fuselage segment of claim 1,
wherein the first circumferential section (UA1) extends clockwise and anticlockwise from the vertical symmetry axis,
wherein the further circumferential sections follow on from the first circumferential section UA1 clockwise in the following order:
the second circumferential section (UA2), the third circumferential section (UA3), the fourth circumferential section (UA4), a fifth circumferential section (UA5) and a sixth circumferential section (UA6).

11. The fuselage segment of claim 10,
wherein due to the vertical symmetry axis, the third circumferential section (UA3) and the fifth circumferential section (UA5) are in each case identical in terms of the curvature and the circumferential length, and
wherein due to the vertical symmetry axis, the second circumferential section (UA2) and the sixth circumferential section (UA6) are in each case identical in terms of the curvature and the circumferential length.

12. An aircraft fuselage comprising a fuselage segment comprising:
a curved external surface with a first radius of curvature (R1), a second radius of curvature (R2), a third radius of curvature (R3) and a fourth radius of curvature (R4),
wherein the four radii of curvature are situated in the same plane, and
wherein the four radii of curvature comprise different centre points;
wherein the first radius of curvature (R1) describes a first circumferential section (UA1) of the fuselage segment at an angle α, the second circumferential section (UA2) being adjacent to the first circumferential section (UA1);
wherein the second radius of curvature (R2) describes a second circumferential section (UA2) of the fuselage segment at an angle β, the third circumferential section (UA3) being adjacent to the second circumferential section (UA2);
wherein the third radius of curvature (R3) describes a third circumferential section (UA3) of the fuselage segment at an angle γ, the fourth circumferential section (UA4) being adjacent to the third circumferential section (UA3);
wherein the fourth radius of curvature (R4) describes a fourth circumferential section (UA4) of the fuselage segment at an angle δ, and
wherein the following applies: $\alpha<\beta$, $\beta>\gamma$ and $\gamma<\delta$.

13. An aircraft comprising an aircraft fuselage comprising a fuselage segment comprising:
a curved external surface with a first radius of curvature (R1), a second radius of curvature (R2), a third radius of curvature (R3) and a fourth radius of curvature (R4),
wherein the four radii of curvature are situated in the same plane, and
wherein the four radii of curvature comprise different centre points;
wherein the first radius of curvature (R1) describes a first circumferential section (UA1) of the fuselage segment at an angle α, the second circumferential section (UA2) being adjacent to the first circumferential section (UA1);
wherein the second radius of curvature (R2) describes a second circumferential section (UA2) of the fuselage segment at an angle β, the third circumferential section (UA3) being adjacent to the second circumferential section (UA2);
wherein the third radius of curvature (R3) describes a third circumferential section (UA3) of the fuselage segment at an angle γ, the fourth circumferential section (UA4) being adjacent to the third circumferential section (UA3);

wherein the fourth radius of curvature (R4) describes a fourth circumferential section (UA4) of the fuselage segment at an angle δ, and wherein the following applies: $\alpha<\beta$, $\beta>\gamma$ and $\gamma<\delta$.

* * * * *